United States Patent
Candido de Lima, Jr. et al.

(10) Patent No.: US 11,093,272 B2
(45) Date of Patent: Aug. 17, 2021

(54) VIRTUAL MACHINE ALLOCATION AND MIGRATION BETWEEN HARDWARE DEVICES BY DESTROYING AND GENERATING ENCLAVES USING TRANSMITTED DATAFILES AND CRYPTOGRAPHIC KEYS

(71) Applicant: INTERNATIONAL BUSINESS MACHINES CORPORATION, Armonk, NY (US)

(72) Inventors: Juscelino C. Candido de Lima, Jr., Sao Paulo (BR); Breno H. Leitao, Araraquara (BR); Fabio M. Tanada, Campinas (BR)

(73) Assignee: International Business Machines Corporation, Armonk, NY (US)

( * ) Notice: Subject to any disclaimer, the term of this patent is extended or adjusted under 35 U.S.C. 154(b) by 134 days.

(21) Appl. No.: 16/019,588

(22) Filed: Jun. 27, 2018

(65) Prior Publication Data
US 2020/0004568 A1 Jan. 2, 2020

(51) Int. Cl.
*G06F 9/455* (2018.01)
*G06F 11/14* (2006.01)
*G06F 16/185* (2019.01)

(52) U.S. Cl.
CPC ...... *G06F 9/45558* (2013.01); *G06F 11/1407* (2013.01); *G06F 11/1438* (2013.01); *G06F 16/185* (2019.01); *G06F 2009/4557* (2013.01); *G06F 2009/45562* (2013.01); *G06F 2009/45575* (2013.01)

(58) Field of Classification Search
None
See application file for complete search history.

(56) References Cited

U.S. PATENT DOCUMENTS 9,053,059 B2    6/2015   Scott-Nash
9,286,097 B2 *   3/2016   Rothman ............ G06F 9/45533
(Continued)

OTHER PUBLICATIONS

Anati, Ittai et al.; Innovative Technology for CPU Based Attestation and Sealing; Intel Software Developer Zone White Paper; software.intel.com/en-us/articles/innovative-technology-for-cpu-based-attestation-and-sealing; Aug. 14, 2013; 7 pages.
(Continued)

*Primary Examiner* — Michael W Ayers
(74) *Attorney, Agent, or Firm* — Schmeiser, Olsen & Watts; Maeve M. Carpenter (57) ABSTRACT

A method and system for improving virtual machine allocation and migration is provided. The method includes initiating a migration process for migrating database files of a virtual machine from a first hardware device to a second hardware device. A checkpoint and restart command is transmitted to a first hypervisor of the first hardware device and a request for a cryptographic key from a memory encryption engine is received. The cryptographic key is transmitted to a first enclave and the first enclave is encrypted resulting in an encrypted enclave. A resulting a data file comprising the database files is generated and the encrypted enclave is disconnected from the first hardware device. The encrypted enclave is destroyed and checkpoint and restart code is executed for restarting the first hardware device.

17 Claims, 6 Drawing Sheets

(56) References Cited

U.S. PATENT DOCUMENTS

| | | |
|---|---|---|
| 9,442,752 B1 | 9/2016 | Roth et al. |
| 2012/0159184 A1 | 6/2012 | Johnson et al. |
| 2013/0151831 A1* | 6/2013 | Bealkowski ........ G06F 9/45533 |
| | | 713/2 |
| 2014/0006776 A1 | 1/2014 | Scott-Nash et al. |
| 2014/0007087 A1 | 1/2014 | Scott-Nash et al. |
| 2014/0245293 A1* | 8/2014 | Tsirkin .................. G06F 3/0604 |
| | | 718/1 |
| 2014/0258733 A1* | 9/2014 | Scott-Nash ......... G06F 9/45558 |
| | | 713/190 |
| 2015/0089173 A1 | 3/2015 | Chhabra et al. |
| 2015/0089502 A1 | 3/2015 | Horovitz et al. |
| 2015/0100960 A1* | 4/2015 | Shigeta .................. H04L 67/14 |
| | | 718/1 |
| 2015/0327768 A1* | 11/2015 | Oyama .................. A61B 5/748 |
| | | 600/407 |
| 2015/0347768 A1* | 12/2015 | Martin .................... G06F 21/10 |
| | | 726/1 |
| 2016/0217050 A1 | 7/2016 | Grimm et al. |
| 2016/0378688 A1 | 12/2016 | Rozas et al. |
| 2017/0039368 A1* | 2/2017 | Grobman ............... H04W 12/06 |
| 2017/0054557 A1* | 2/2017 | Rozas .................... H04L 9/0891 |
| 2018/0183578 A1* | 6/2018 | Chakrabarti .......... H04L 9/0861 |
| 2018/0183580 A1* | 6/2018 | Scarlata ................ G06F 9/4856 |
| 2018/0203801 A1* | 7/2018 | Leslie-Hurd ......... G06F 9/45558 |
| 2018/0211034 A1* | 7/2018 | Costa ...................... G06F 21/53 |
| 2019/0044729 A1* | 2/2019 | Chhabra ............... H04L 9/0637 |
| 2019/0065229 A1* | 2/2019 | Tsirkin ................ H04L 43/0817 |

OTHER PUBLICATIONS

Park, Jaemin et al.; Toward Live Migration of SGX-Enabled Virtual Machines; 2016 IEEE World Congress on Services; Jun. 27-Jul. 2, 2016; 3 pages.

Arnautov, Sergei et al.; SCONE: Secure Linux Containers with Intel SGX; 12th USENIX Symposium on Operating Systems Design and Implementation; Nov. 2-4, 2016; pp. 689-703.

* cited by examiner

VIRTUAL MACHINE ALLOCATION AND MIGRATION BETWEEN HARDWARE DEVICES BY DESTROYING AND GENERATING ENCLAVES USING TRANSMITTED DATAFILES AND CRYPTOGRAPHIC KEYS

FIELD

The present invention relates generally to a method for allocating virtual machines and in particular to a method and associated system for improving virtual machine technology associated with allocating and migrating virtual machines between hardware devices for improving an efficiency with respect to data security and transmission speed.

BACKGROUND

Accurately enabling transmissions between devices typically includes an inaccurate process with little flexibility. Determining security solutions with respect to routing data between devices may include a complicated process that may be time consuming and require a large amount of resources. Accordingly, there exists a need in the art to overcome at least some of the deficiencies and limitations described herein above.

SUMMARY

A first aspect of the invention provides a virtual machine allocation and migration improvement method comprising: initiating, by a processor of a first hardware device, a migration process for migrating database files of a virtual machine from the first hardware device to a second hardware device; transmitting, by the processor in response to the initiating, a checkpoint and restart command to a first hypervisor of the first hardware device; receiving, by the processor from a first enclave of a memory structure of the first hardware device, a request for a cryptographic key from a memory encryption engine of the processor; transmitting, by the processor in response to the receiving the request, the cryptographic key to the first enclave; encrypting, by the processor via usage of the cryptographic key, the first enclave resulting in a first encrypted enclave; generating, by the processor executing the first encrypted enclave, a data file comprising the database files; disconnecting, by the processor, the first encrypted enclave from the first hardware device; destroying, by the processor, the first encrypted enclave; and executing, by the processor in response to enabling the checkpoint and restart command, checkpoint and restart code for restarting the first hardware device.

A second aspect of the invention provides a computer program product, comprising a computer readable hardware storage device storing a computer readable program code, the computer readable program code comprising an algorithm that when executed by a processor of a first hardware device implements a virtual machine allocation and migration improvement method, the method comprising: initiating, by the processor, a migration process for migrating database files of a virtual machine from the first hardware device to a second hardware device; transmitting, by the processor in response to the initiating, a checkpoint and restart command to a first hypervisor of the first hardware device; receiving, by the processor from a first enclave of a memory structure of the first hardware device, a request for a cryptographic key from a memory encryption engine of the processor; transmitting, by the processor in response to the receiving the request, the cryptographic key to the first enclave; encrypting, by the processor via usage of the cryptographic key, the first enclave resulting in a first encrypted enclave; generating, by the processor executing the first encrypted enclave, a data file comprising the database files; disconnecting, by the processor, the first encrypted enclave from the first hardware device; destroying, by the processor, the first encrypted enclave; and executing, by the processor in response to enabling the checkpoint and restart command, checkpoint and restart code for restarting the first hardware device.

A third aspect of the invention provides a first hardware device comprising a processor coupled to a computer-readable memory unit, the memory unit comprising instructions that when executed by the computer processor implements a virtual machine allocation and migration improvement method comprising: initiating, by the processor, a migration process for migrating database files of a virtual machine from the first hardware device to a second hardware device; transmitting, by the processor in response to the initiating, a checkpoint and restart command to a first hypervisor of the first hardware device; receiving, by the processor from a first enclave of a memory structure of the first hardware device, a request for a cryptographic key from a memory encryption engine of the processor; transmitting, by the processor in response to the receiving the request, the cryptographic key to the first enclave; encrypting, by the processor via usage of the cryptographic key, the first enclave resulting in a first encrypted enclave; generating, by the processor executing the first encrypted enclave, a data file comprising the database files; disconnecting, by the processor, the first encrypted enclave from the first hardware device; destroying, by the processor, the first encrypted enclave; and executing, by the processor in response to enabling the checkpoint and restart command, checkpoint and restart code for restarting the first hardware device.

The present invention advantageously provides a simple method and associated system capable of accurately enabling transmissions between devices.

DETAILED DESCRIPTION

Figure 1:
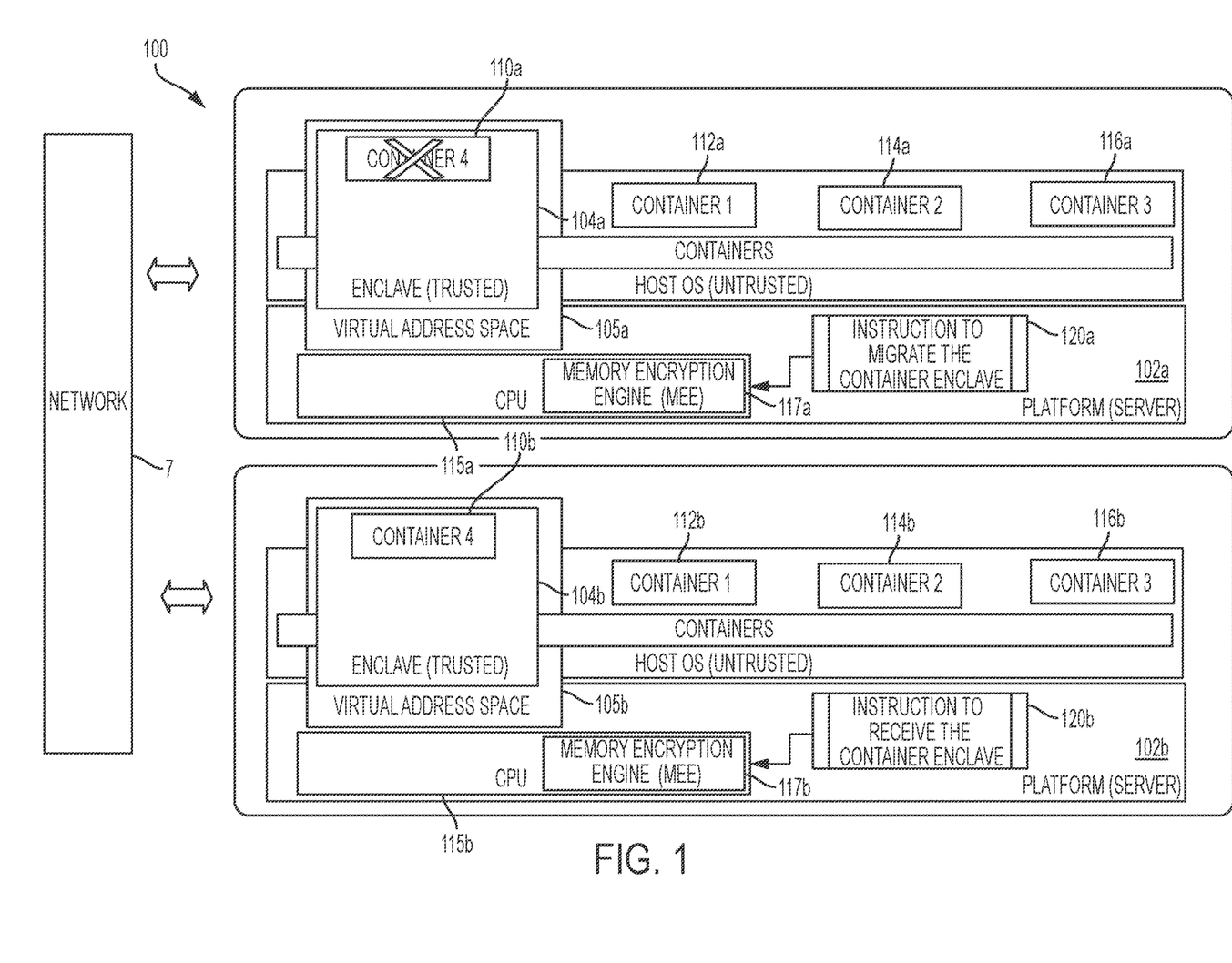
FIG. 1 illustrates a system for improving g virtual machine technology associated with allocating and migrating virtual machines between hardware devices for improving an efficiency with respect to data security and transmission speed, in accordance with embodiments of the present invention.

FIG. 1 illustrates a system 100 for improving virtual machine technology associated with allocating and migrating virtual machines between hardware devices 102a and 102b for improving an efficiency with respect to data security and transmission speed, in accordance with embodiments of the present invention. System 100 enables the allocation of virtual machines (VMs) within an enclave via hardware enforced access processes. An (secure) enclave comprises a set of CPU instruction codes that provide a secure location for a software application to execute code and store data within an operating system (OS) process. An enclave may be executed from an enclave page cache (EPC). Enclave pages are loaded into an EPC via an OS. When a page of an enclave is removed from the EPC, cryptographic protection mechanisms are used to protect the confidentiality of the enclave and detect tampering when the enclave is loaded back into the EPC. Enclave data within the EPC is protected via usage of access control mechanisms executed by a processor.

System 100 is configured to allocate sensitive data within a namespace stored within an enclave and allow a user to execute VM (e.g., container) checkpoint code for restarting a VM within the enclave. Additionally, system 100 allows the VM checkpoint code to restart within differing (from the enclave VM) hardware. System 100 enables enclave VMs to be migrated via execution of checkpoint and restart code. Additionally, system 100 enables a trusted hardware/software mechanism for exchanging (digital) cryptographic keys between enclaves.

System 100 of FIG. 1 includes a server hardware device 102a connected through a network 7 a server hardware device 102b. Server hardware device 102a comprises an enclave 104a within virtual address space 105a, VMs 110a, 112a, 114a, and 116a, an operating system 147a, a CPU 115a comprising memory encryption engine 117a, and migration instruction code 120a. Server hardware device 102b comprises an enclave 104b within virtual address space 105b, VMs 110b, 112b, 114b, and 116b, an operating system 147b, a CPU 115b comprising memory encryption engine 117b, and migration instruction code 120b. Server hardware device and server hardware device 102b each may comprise an embedded device. An embedded device is defined herein as a dedicated device or computer comprising a combination of computer hardware and software (fixed in capability or programmable) specifically designed for executing a specialized function. Programmable embedded computers or devices may comprise specialized programming interfaces. In one embodiment, notification server hardware device and server hardware device 102b may each comprise a specialized hardware device comprising specialized (non-generic) hardware and circuitry (i.e., specialized discrete non-generic analog, digital, and logic based circuitry) for (independently or in combination) executing a process described with respect to FIGS. 1-6. The specialized discrete non-generic analog, digital, and logic based circuitry may include proprietary specially designed components (e.g., a specialized integrated circuit, such as for example an Application Specific Integrated Circuit (ASIC) designed for only implementing an automated process for improving virtual machine technology associated with allocating and migrating virtual machines between hardware devices 102a and 102b. The specialized discrete non-generic analog, digital, and logic based circuitry may include any type of internal or external sensors including, inter alia, temperature sensors, an optical sensor, voltage sensors, network traffic sensors, etc. Network 7 may include any type of network including, inter alia, a local area network, (LAN), a wide area network (WAN), the Internet, a wireless network, etc.

System 100 enables the following process for allocating and migrating virtual machines between hardware devices 102a and 102b:

The process is initiated when a VM framework of server hardware device 102a transmits a checkpoint and restart command to an associated hypervisor of server hardware device 102a. In response, a request for a cryptographic key for enclave 104a is received and the cryptographic key is transmitted from memory encryption engine 117a to enclave 104a. Enclave 104a is encrypted (via execution of the cryptographic key) and an associated data file is generated. A process for performing an un-enclave with respect to a memory structure of server hardware device 102b is executed and the enclave 104a is destroyed. Additionally, a checkpoint and restart function is executed with respect to server hardware device 102a. The cryptographic key and data file are transferred (via a guard mechanism comprising specialized hardware and software) from server hardware device 102a to server hardware device 102b. In response, enclave 104b is generated and an associated a bootstrap operation for enclave 104b is initiated via execution of the cryptographic key and the data file. An associated hypervisor of server hardware device 102b is notified that enclave 104b has been generated.

Figure 2:
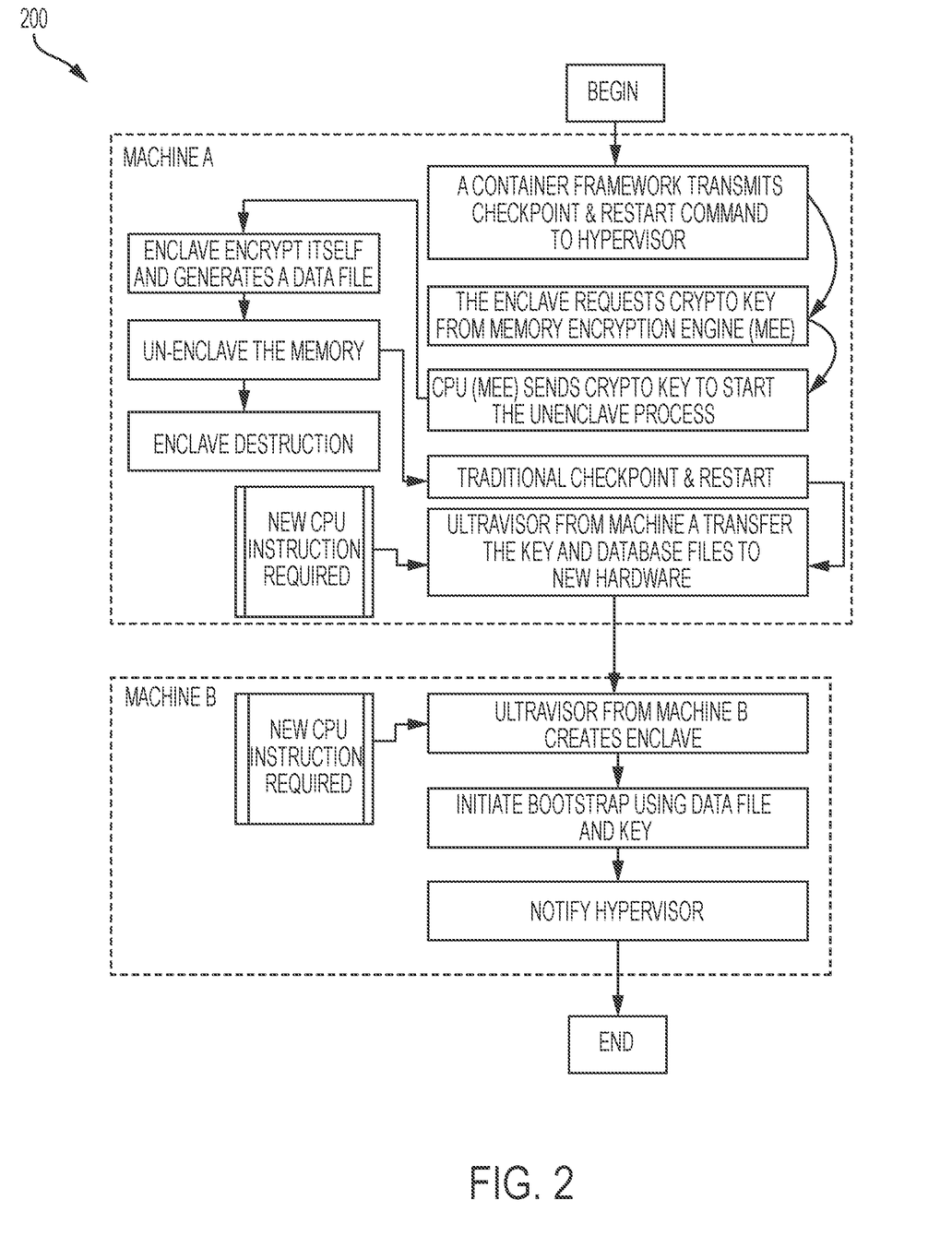
FIG. 2 illustrates an algorithm detailing an implementation example enabled by the system of FIG. 1 for improving container based virtual machine technology, in accordance with embodiments of the present invention.

FIG. 2 illustrates an algorithm 200 detailing an implementation example enabled by system 100 of FIG. 1 for improving container based virtual machine technology, in accordance with embodiments of the present invention. Each of the steps in the algorithm of FIG. 2 may be enabled and executed in any order by a computer processor(s) executing computer code. Additionally, each of the steps in the algorithm of FIG. 2 may be enabled and executed in combination by server hardware device 102a and server hardware device 102b. The algorithm 200 executes a process for enabling a container framework (within a machine AS) to transmit a checkpoint and restart command notification to a hypervisor and in response, an enclave is enabled to transmit a cryptographic key request to a CPU of the machine A. The CPU transmits the cryptographic key and the enclave initiates a process for encrypting itself. Additionally, a resulting data file is generated. When the enclave is encrypted, an un-enclave process is initiated and a check point and restart process is executed. Additionally, the enclave within machine A is destroyed and an ultravisor within machine A transmits the cryptographic key and the data file to a new hardware provider (i.e. machine B). The aforementioned transmission is triggered via a new CPU instruction set. Likewise, an ultravisor from machine B initiates a receiving process by creating a new enclave to store the cryptographic key and the data file. A subsequent bootstrap process is executed with respect to the data file and the cryptographic key. An associated notification is transmitted to a hypervisor at within machine B.

Figure 3:
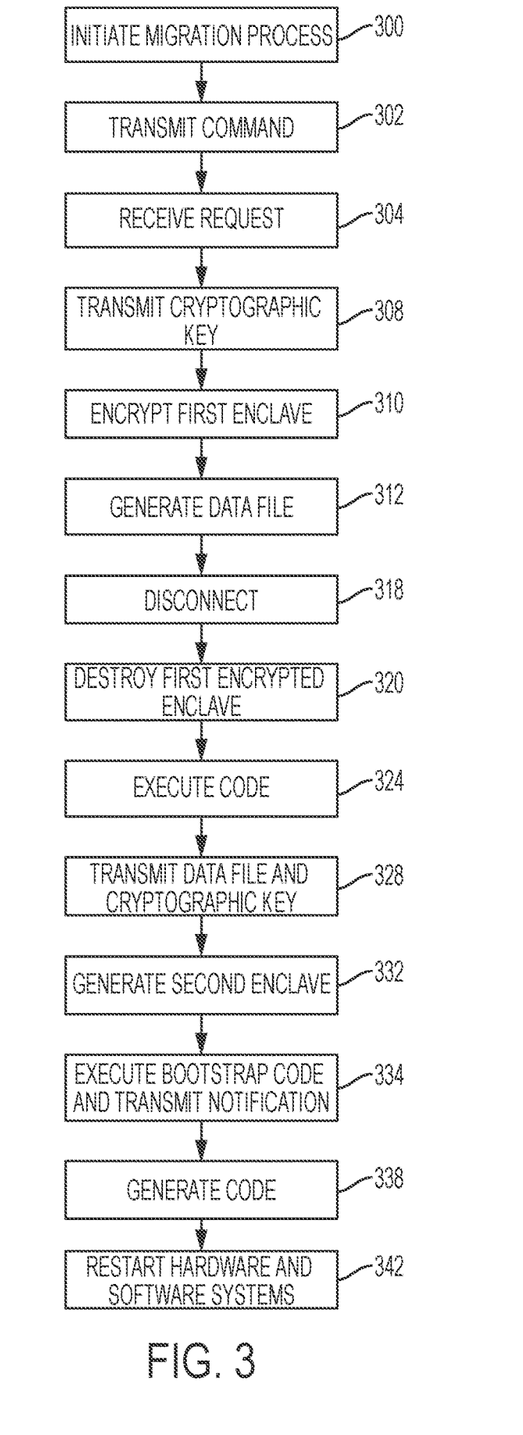
FIG. 3 illustrates an algorithm enabled by the system of FIG. 1 for improving virtual machine technology associated with allocating and migrating virtual machines between hardware devices, in accordance with embodiments of the present invention.

FIG. 3 illustrates an algorithm enabled by system 100 of FIG. 1 for improving virtual machine technology associated with allocating and migrating virtual machines between hardware devices, in accordance with embodiments of the present invention. Each of the steps in the algorithm of FIG. 3 may be enabled and executed in any order by a computer processor(s) executing computer code. Additionally, each of the steps in the algorithm of FIG. 3 may be enabled and executed in combination by server hardware device 102a and server hardware device 102b. In step 300, a migration process for migrating database files of a virtual machine from a first hardware device to a second hardware device is initiated. The first hardware device and second hardware device may each include a plurality of virtual machines. In step 302, a checkpoint and restart command is transmitted to a first hypervisor of the first hardware device. In step 304, a request for a cryptographic key from a memory encryption engine is received from a first enclave of a memory structure of the first hardware device. In step 308, a cryptographic key is transmitted to the first enclave. In step 310, the first enclave is encrypted (via usage of the cryptographic key) resulting in a first encrypted enclave. In step 312, a data file (comprising the database files) is generated within the first encrypted enclave. In step 318, the first encrypted enclave is disconnected from the first hardware device. For example, communications between the first encrypted enclave and an operating system of the first hardware device may be disabled. In step 320, the first encrypted enclave is destroyed (e.g., deleted). In step 324, checkpoint and restart code is executed in response to enabling the checkpoint and restart command. The checkpoint and restart code is configured for restarting the first hardware device. In step 328, the datafile and cryptographic key are transmitted to a second hardware device. In step 332, a second enclave is generated within the second hardware device. The second enclave is generated with respect to the datafile and cryptographic key. In step 334, bootstrap operational code is executed for the second enclave with respect to the cryptographic key and the data file. Additionally, a notification indicating the second enclave is transmitted to a hypervisor of the second hardware device. In step 338, computer code for executing the migration process is generated. In step 342, hardware and software systems of the first hardware device are restarted in response to said executing the checkpoint and restart code.

Figure 4:
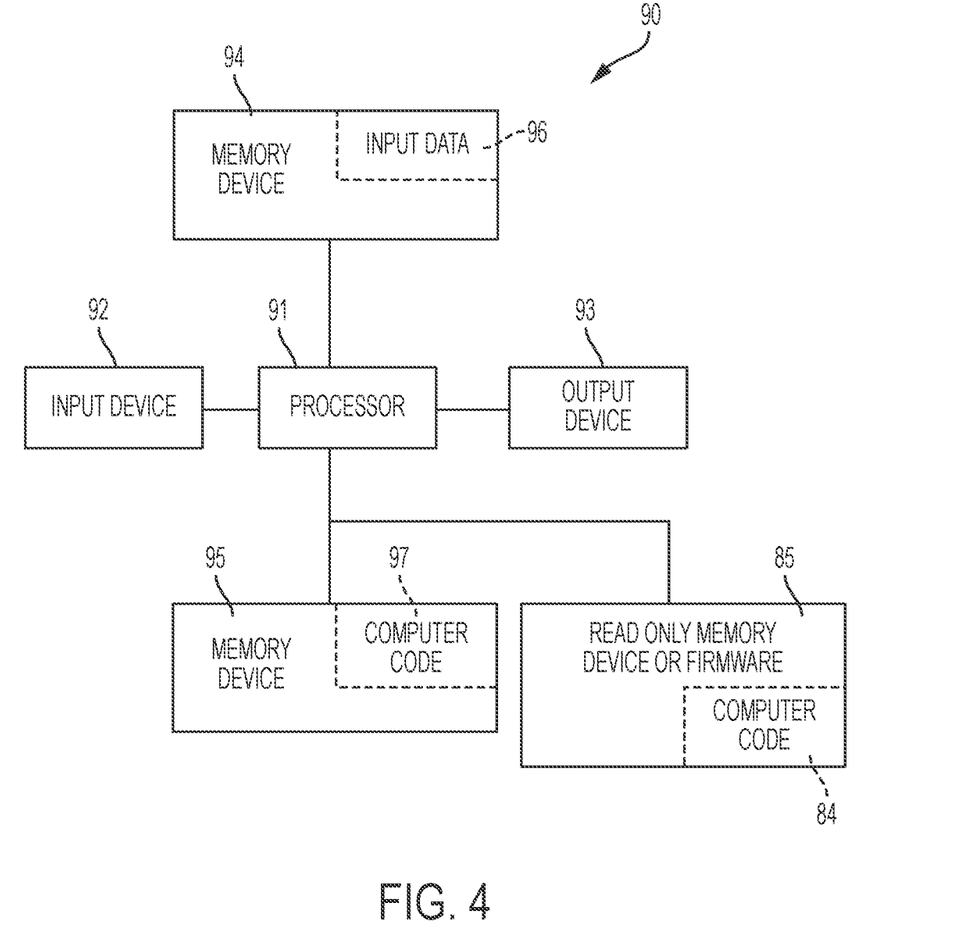
FIG. 4 illustrates a computer system used by the system of FIG. 1 for enabling a process for improving virtual machine technology associated with allocating and migrating virtual machines between hardware devices, in accordance with embodiments of the present invention.

FIG. 4 illustrates a computer system 90 (e.g., server hardware device 102a and server hardware device 102b of FIG. 1) used by or comprised by the system of FIG. 1 for improving virtual machine technology associated with allocating and migrating virtual machines between hardware devices, in accordance with embodiments of the present invention.

Aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing apparatus receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++, spark, R language, or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, device (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing device to produce a machine, such that the instructions, which execute via the processor of the computer or other programmable data processing device, create means for implementing the functions/acts specified in the flowchart and/or block diagram block or blocks. These computer readable program instructions may also be stored in a computer readable storage medium that can direct a computer, a programmable data processing device, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing device, or other device to cause a series of operational steps to be performed on the computer, other programmable device or other device to produce a computer implemented process, such that the instructions which execute on the computer, other programmable device, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The computer system 90 illustrated in FIG. 4 includes a processor 91, an input device 92 coupled to the processor 91, an output device 93 coupled to the processor 91, and memory devices 94 and 95 each coupled to the processor 91. The input device 92 may be, inter alia, a keyboard, a mouse, a camera, a touchscreen, etc. The output device 93 may be, inter alia, a printer, a plotter, a computer screen, a magnetic tape, a removable hard disk, a floppy disk, etc. The memory devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 95 includes a computer code 97. The computer code 97 includes algorithms (e.g., the algorithms of FIGS. 2 and 3) for virtual machine technology associated with allocating and migrating virtual machines between hardware devices. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices Such as read only memory device 96) may include algorithms (e.g., the algorithms of FIGS. 2 and 3) and may be used as a computer usable medium (or a computer readable medium or a program storage device) having a computer readable program code embodied therein and/or having other data stored therein, wherein the computer readable program code includes the computer code 97. Generally, a computer program product (or, alternatively, an article of manufacture) of the computer system 90 may include the computer usable medium (or the program storage device).

In some embodiments, rather than being stored and accessed from a hard drive, optical disc or other writeable, rewriteable, or removable hardware memory device 95, stored computer program code 84 (e.g., including algorithms) may be stored on a static, nonremovable, read-only storage medium such as a Read-Only Memory (ROM) device 85, or may be accessed by processor 91 directly from such a static, nonremovable, read-only medium 85. Similarly, in some embodiments, stored computer program code 97 may be stored as computer-readable firmware 85, or may be accessed by processor 91 directly from such firmware 85, rather than from a more dynamic or removable hardware data-storage device 95, such as a hard drive or optical disc.

Still yet, any of the components of the present invention could be created, integrated, hosted, maintained, deployed, managed, serviced, etc. by a service supplier who offers to improve virtual machine technology associated with allocating and migrating virtual machines between hardware devices. Thus, the present invention discloses a process for deploying, creating, integrating, hosting, maintaining, and/or integrating computing infrastructure, including integrating computer-readable code into the computer system 90, wherein the code in combination with the computer system 90 is capable of performing a method for enabling a process for improving virtual machine technology associated with allocating and migrating virtual machines between hardware devices. In another embodiment, the invention provides a business method that performs the process steps of the invention on a subscription, advertising, and/or fee basis. That is, a service supplier, such as a Solution Integrator, could offer to enable a process for improving virtual machine technology associated with allocating and migrating virtual machines between hardware devices. In this case, the service supplier can create, maintain, support, etc. a computer infrastructure that performs the process steps of the invention for one or more customers. In return, the service supplier can receive payment from the customer(s) under a subscription and/or fee agreement and/or the service supplier can receive payment from the sale of advertising content to one or more third parties.

While FIG. 4 shows the computer system 90 as a particular configuration of hardware and software, any configuration of hardware and software, as would be known to a person of ordinary skill in the art, may be utilized for the purposes stated supra in conjunction with the particular computer system 90 of FIG. 4. For example, the memory devices 94 and 95 may be portions of a single memory device rather than separate memory devices.

Cloud Computing Environment

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
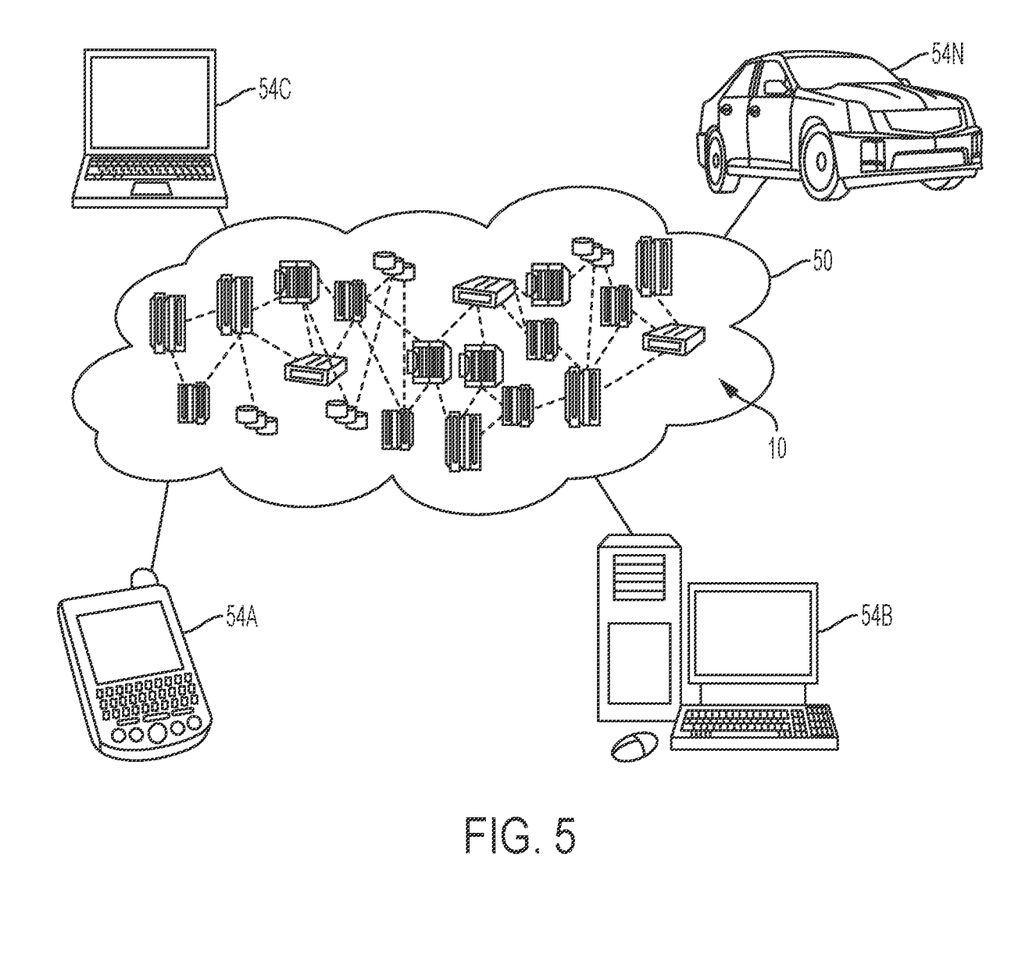
FIG. 5 illustrates a cloud computing environment, in accordance with embodiments of the present invention.

Referring now to FIG. 5, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A, 54B, 54C and 54N shown in FIG. 5 are intended to be illustrative only and that computing nodes 10 and cloud computing environment 50 can communicate with any type of computerized device over any type of network and/or network addressable connection (e.g., using a web browser).

Figure 6:
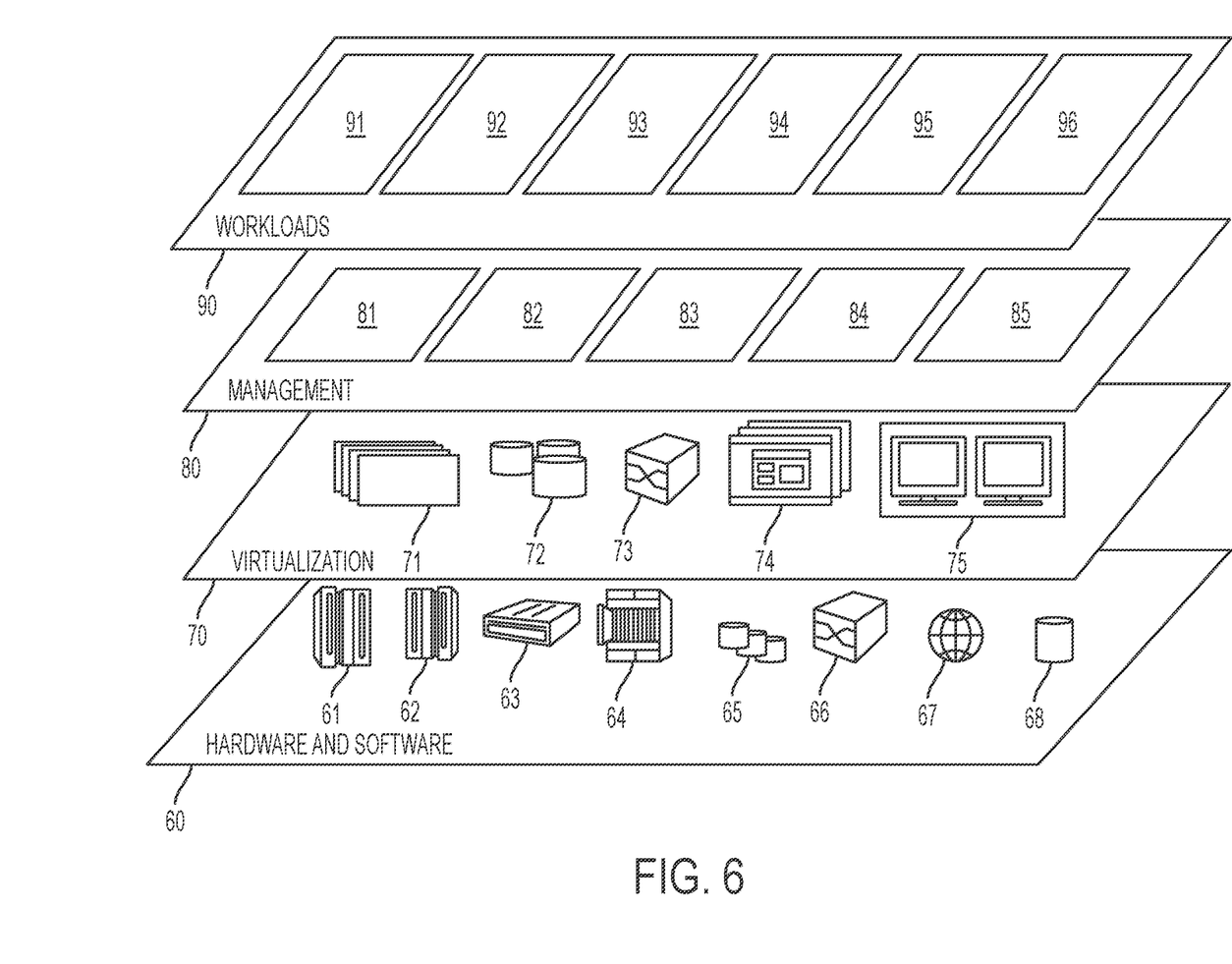
FIG. 6 illustrates a set of functional abstraction layers provided by cloud computing environment, in accordance with embodiments of the present invention.

Referring now to FIG. 6, a set of functional abstraction layers provided by cloud computing environment 50 (see FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below.

Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 89 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and for improving virtual machine technology associated with allocating and migrating virtual machines between hardware devices 96.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A virtual machine allocation and migration improvement method comprising:
   initiating, by a processor of a first hardware device executing an original CPU instruction set, a migration process for migrating database files of a virtual machine from said first hardware device to a second hardware device;
   transmitting, by said processor in response to said initiating, a checkpoint and restart command to a first hypervisor of said first hardware device;
   receiving, by said processor from a first enclave within a first virtual address space of a memory structure of said first hardware device, a request for a cryptographic key from a memory encryption engine of said processor, wherein said first enclave stores sensitive data within a namespace stored within said first enclave;
   transmitting, by said processor in response to said receiving said request, said cryptographic key from said memory encryption engine to said first enclave;
   encrypting, by said processor via usage of said cryptographic key, said first enclave resulting in a first encrypted enclave;
   generating, by said processor executing said first encrypted enclave from an enclave page cache, a datafile comprising said database files;
   loading, by said processor via an untrusted host operating system, associated enclave pages into said enclave page cache;
   removing by said processor, said associated enclave pages from said enclave page cache;
   reloading, by said processor, said associated enclave pages into said enclave page cache;
   detecting, by said processor via a cryptographic protection mechanism of a memory encryption engine, unauthorized tampering during said reloading;
   protecting, by said processor via usage of hardware enforced access control mechanisms executed by said processor, said datafile within said enclave page cache during said unauthorized tampering;
   executing, by said processor, an un-enclave process for said first encrypted enclave with respect to said memory structure, wherein said executing said un-enclave process comprises:
      disconnecting, by said processor, said first encrypted enclave from said first hardware device;
      destroying, by said processor, said first encrypted enclave; and
      executing, by said processor in response to enabling said checkpoint and restart command with respect to said sensitive data, checkpoint and restart code for restarting said first hardware device;
   determining, by said processor, that a new CPU instruction set is required for executing a transfer process and providing a secure location for executing associated code and storing said datafile within a process of said untrusted host operating system;
   transmitting via said transfer process using said new CPU instruction set, by said processor via a guard mechanism, said datafile and said cryptographic key to said second hardware device, wherein said second hardware device differs from said first hardware device;
   generating, by said processor with respect to said datafile and said cryptographic key, a second enclave within a second virtual address space of said second hardware device;
   executing, by said processor, bootstrap operational code for said second enclave with respect to execution of said cryptographic key within said second enclave and said datafile;
   transmitting, by said processor to a hypervisor of said second hardware device, a notification indicating said second enclave;
   migrating, by said processor in response to said executing said bootstrap operational code and said transmitting said notification, said virtual machine from said first hardware device to said second hardware device; and
   restarting, by said processor, said second hardware device.

2. The method of claim 1, further comprising:
   generating, by said processor, computer code for executing said migration process.

3. The method of claim 1, wherein said first hardware device comprises a plurality of virtual machines.

4. The method of claim 1, wherein said destroying said first encrypted enclave comprises deleting said first encrypted enclave.

5. The method of claim 1, wherein said disconnecting said first encrypted enclave from said first hardware device comprises disabling communications between said first encrypted enclave and an operating system of said first hardware device.

6. The method of claim 1, further comprising:
   restarting, by said processor in response to said executing said checkpoint and restart code, hardware and software systems of said first hardware device.

7. The method of claim 1, wherein said virtual machine comprises a memory container.

8. The method of claim 1, further comprising:
providing at least one support service for at least one of creating, integrating, hosting, maintaining, and deploying computer-readable code in the control hardware, said code being executed by the computer processor to implement: said initiating, said transmitting said checkpoint and restart command, said receiving, said transmitting said cryptographic key, said encrypting, said generating, said disconnecting, said destroying, and said executing.

9. A computer program product, comprising a computer readable hardware storage device storing a computer readable program code, said computer readable program code comprising an algorithm that when executed by a processor of a first hardware device implements a virtual machine allocation and migration improvement method, said method comprising:

initiating, by said processor executing an original CPU instruction set, a migration process for migrating database files of a virtual machine from said first hardware device to a second hardware device;

transmitting, by said processor in response to said initiating, a checkpoint and restart command to a first hypervisor of said first hardware device;

receiving, by said processor from a first enclave within a first virtual address space of a memory structure of said first hardware device, a request for a cryptographic key from a memory encryption engine of said processor, wherein said first enclave stores sensitive data within a namespace stored within said first enclave;

transmitting, by said processor in response to said receiving said request, said cryptographic key from said memory encryption engine to said first enclave;

encrypting, by said processor via usage of said cryptographic key, said first enclave resulting in a first encrypted enclave;

generating, by said processor executing said first encrypted enclave from an enclave page cache, a datafile comprising said database files:

loading, by said processor via an untrusted host operating system, associated enclave pages into said enclave page cache;

removing by said processor, said associated enclave pages from said enclave page cache; reloading, by said processor, said associated enclave pages into said enclave page cache;

detecting, by said processor via a cryptographic protection mechanism of a memory encryption engine, unauthorized tampering during said reloading;

protecting, by said processor via usage of hardware enforced access control mechanisms executed by said processor, said datafile within said enclave page cache during said unauthorized tampering;

executing, by said processor, an un-enclave process for said first encrypted enclave with respect to said memory structure, wherein said executing said un-enclave process comprises:
  disconnecting, by said processor, said first encrypted enclave from said first hardware device;
  destroying, by said processor, said first encrypted enclave; and
  executing, by said processor in response to enabling said checkpoint and restart command with respect to said sensitive data, checkpoint and restart code for restarting said first hardware device;

determining, by said processor, that a new CPU instruction set is required for executing a transfer process and providing a secure location for executing associated code and storing said datafile within a process of said untrusted host operating system;

transmitting via said transfer process using said new CPU instruction set, by said processor via a guard mechanism, said datafile and said cryptographic key to said second hardware device, wherein said second hardware device differs from said first hardware device;

generating, by said processor with respect to said datafile and said cryptographic key, a second enclave within a second virtual address space of said second hardware device;

executing, by said processor, bootstrap operational code for said second enclave with respect to execution of said cryptographic key within said second enclave and said datafile:

transmitting, by said processor to a hypervisor of said second hardware device, a notification indicating said second enclave;

migrating, by said processor in response to said executing said bootstrap operational code and said transmitting said notification, said virtual machine from said first hardware device to said second hardware device; and restarting, by said processor, said second hardware device.

10. The computer program product of claim 9, wherein said method further comprises:
generating, by said processor, computer code for executing said migration process.

11. The computer program product of claim 9, wherein said first hardware device comprises a plurality of virtual machines.

12. The computer program product of claim 9, wherein said destroying said first encrypted enclave comprises deleting said first encrypted enclave.

13. The computer program product of claim 9, wherein said disconnecting said first encrypted enclave from said first hardware device comprises disabling communications between said first encrypted enclave and an operating system of said first hardware device.

14. The computer program product of claim 9, wherein said method further comprises:
restarting, by said processor in response to said executing said checkpoint and restart code, hardware and software systems of said first hardware device.

15. The computer program product of claim 9, wherein said virtual machine comprises a memory container.

16. A first hardware device comprising a processor coupled to a computer-readable memory unit, said memory unit comprising instructions that when executed by the computer processor implements a virtual machine allocation and migration improvement method comprising:

initiating, by said processor executing an original CPU instruction set, a migration process for migrating database files of a virtual machine from said first hardware device to a second hardware device;

transmitting, by said processor in response to said initiating, a checkpoint and restart command to a first hypervisor of said first hardware device;

receiving, by said processor from a first enclave within a first virtual address space of a memory structure of said first hardware device, a request for a cryptographic key from a memory encryption engine of said processor, wherein said first enclave stores sensitive data within a namespace stored within said first enclave;

transmitting, by said processor in response to said receiving said request, said cryptographic key from said memory encryption engine to said first enclave;
encrypting, by said processor via usage of said cryptographic key, said first enclave resulting in a first encrypted enclave;
generating, by said processor executing said first encrypted enclave from an enclave page cache, a datafile comprising said database files;
loading, by said processor via an untrusted host operating system, associated enclave pages into said enclave page cache;
removing by said processor, said associated enclave pages from said enclave page cache;
reloading, by said processor, said associated enclave pages into said enclave page cache;
detecting, by said processor via a cryptographic protection mechanism of a memory encryption engine, unauthorized tampering during said reloading;
protecting, by said processor via usage of hardware enforced access control mechanisms executed by said processor, said datafile within said enclave page cache during said unauthorized tampering;
executing, by said processor, an un-enclave process for said first encrypted enclave with respect to said memory structure, wherein said executing said un-enclave process comprises:
 disconnecting, by said processor, said first encrypted enclave from said first hardware device;
 destroying, by said processor, said first encrypted enclave; and
 executing, by said processor in response to enabling said checkpoint and restart command with respect to said sensitive data, checkpoint and restart code for restarting said first hardware device;
determining, by said processor, that a new CPU instruction set is required for executing a transfer process and providing a secure location for executing associated code and storing said datafile within a process of said untrusted host operating system;
transmitting via said transfer process using said new CPU instruction set, by said processor via a guard mechanism, said datafile and said cryptographic key to said second hardware device, wherein said second hardware device differs from said first hardware device;
generating, by said processor with respect to said datafile and said cryptographic key, a second enclave within a second virtual address space of said second hardware device;
executing, by said processor, bootstrap operational code for said second enclave with respect to execution of said cryptographic key within said second enclave and said datafile;
transmitting, by said processor to a hypervisor of said second hardware device, a notification indicating said second enclave;
migrating, by said processor in response to said executing said bootstrap operational code and said transmitting said notification, said virtual machine from said first hardware device to said second hardware device; and
restarting, by said processor, said second hardware device.

17. The first hardware device of claim 16, wherein said method further comprises:
generating, by said processor, computer code for executing said migration process.

* * * * *